(12) United States Patent
Wei et al.

(10) Patent No.: US 6,290,461 B1
(45) Date of Patent: *Sep. 18, 2001

(54) METHOD AND TOOL FOR ELECTROCHEMICAL MACHINING

(75) Inventors: Bin Wei, Mechanicville; Hsin-Pang Wang, Rexford, both of NY (US)

(73) Assignee: General Electric Company, Schenectady, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/489,901

(22) Filed: Jan. 24, 2000

Related U.S. Application Data
(60) Provisional application No. 60/149,618, filed on Aug. 16, 1999.

(51) Int. Cl.[7] .................................................. F01D 5/18
(52) U.S. Cl. .................................. 416/96 R; 204/224 M; 205/665; 205/672
(58) Field of Search .................................. 205/640, 665, 205/672; 204/224 M, 230.5, 230.2, 230.8

(56) References Cited

U.S. PATENT DOCUMENTS

| | | | |
|---|---|---|---|
| 3,793,169 | 2/1974 | Joslin | 204/129.55 |
| 3,984,911 | 10/1976 | Krug et al. | 29/424 |
| 4,159,407 | 6/1979 | Wilkinson et al. | 219/69 M |
| 4,690,737 | * 9/1987 | Vishnitsky | 204/129.7 |
| 4,907,765 | 3/1990 | Hirschel et al. | 244/200 |
| 5,196,376 | 3/1993 | Reche | 437/225 |
| 5,306,401 | 4/1994 | Fierkens et al. | 204/129.5 |
| 5,320,721 | 6/1994 | Peters | 204/129.1 |
| 5,322,599 | 6/1994 | Peters | 204/129.2 |
| 5,685,971 | 11/1997 | Schroder et al. | 205/642 |

OTHER PUBLICATIONS

Disclosure Letter entitled "Laser Output Coupler to Increase Laser Etching Efficiency", IBM Technical Disclosure Bulletin, Apr. 1994, vol. 37, Issue 4B, pp. 1–2.

* cited by examiner

*Primary Examiner*—Kathryn Gorgos
*Assistant Examiner*—Thomas H Parsons
(74) *Attorney, Agent, or Firm*—Patrick K. Patnode; Douglas E. Stoner

(57) ABSTRACT

An electrochemical machine is disclosed for use in an electrochemical machining process to simultaneously generate different levels of metal removal. The electrochemical machine comprises at least two electrodes, each including an electrically conductive cylinder having an external surface partially coated with an insulated coating. The insulating coating is in a pattern defining raised areas to be formed on an internal surface of a predrilled hole in a workpiece wherein at least one of the electrodes has a varied pattern of insulating coating.

22 Claims, 5 Drawing Sheets

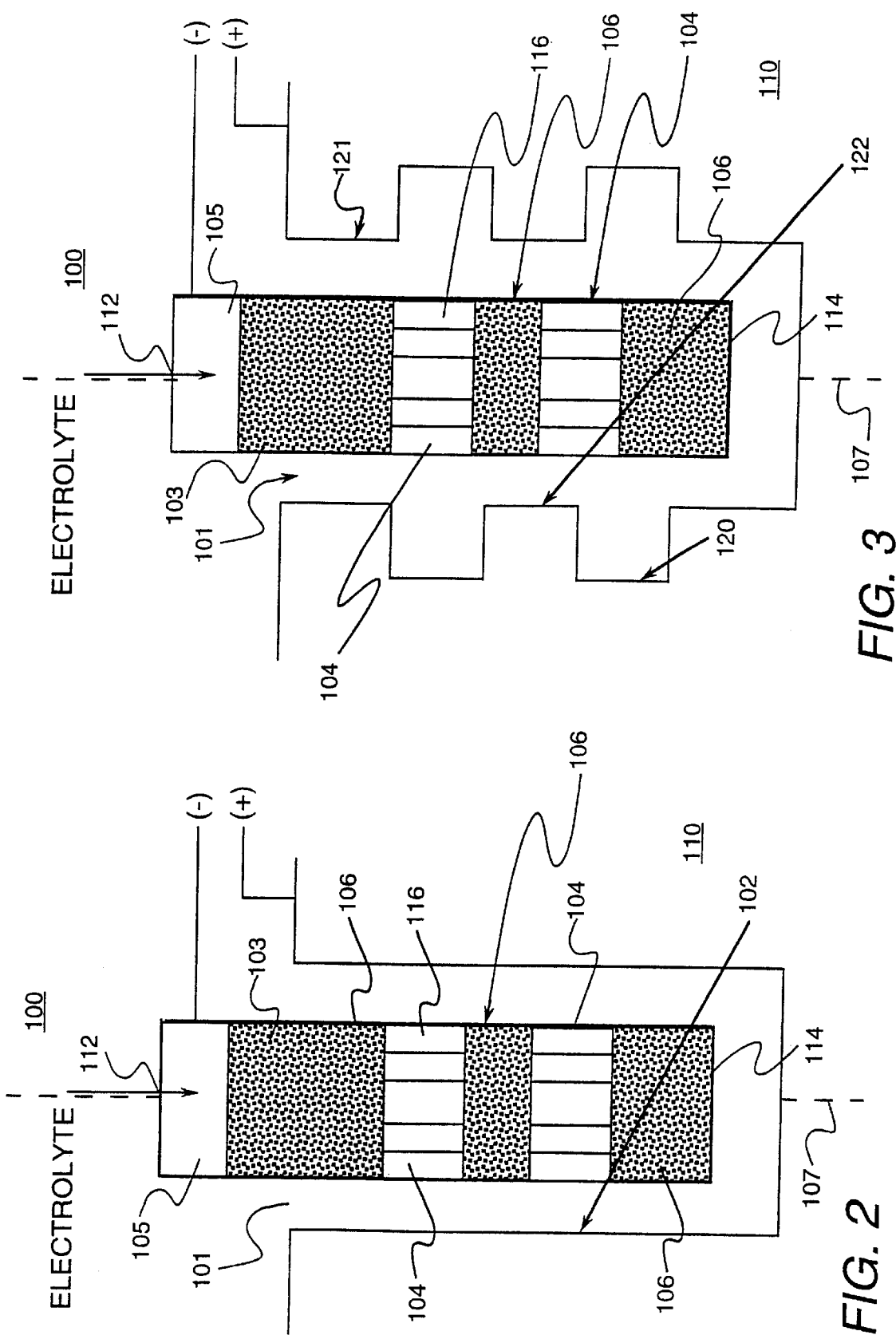

ELECTROLYTE

METHOD AND TOOL FOR ELECTROCHEMICAL MACHINING

CROSS REFERENCE TO RELATED APPLICATIONS

This application claims priority from U.S. Provisional Application No. 60/149,618, filed on Aug. 16, 1999, entitled "Method and Tool for Electrochemical Machining," which application is herein incorporated by reference.

This application is related to commonly assigned B. Wei et al., "A Method and Tool for Electrochemical Machining," U.S. Provisional Application No. 60/149,619, filed Aug. 16, 1999, B. Wei et al., "A Method and Tool for Electrochemical Machining," U.S. Provisional Application No. 60/149,616, filed Aug. 16, 1999, B. Wei et al., "A Method and Tool for Electrochemical Machining," U.S. Provisional Application No. 60/149,617, filed Aug. 16, 1999, and each are herein incorporated by reference. Additionally, this application is related to commonly assigned B. Wei et al., "A Method and Tool for Electrochemical Machining," U.S. Application Ser. No. 09/187,663, filed Nov. 5, 1998 (now U.S. Pat. No. 6,200,439), and R. Guida et al., "Process for Fabricating a Tool used in Electrochemical Machining," U.S. Application Ser. No. 09/187,664, filed Nov. 5, 1998, pending each of which are herein incorporated by reference.

BACKGROUND OF THE INVENTION

1. Field of the Invention

This invention relates to a tool and a method used for electrochemical machining. More particularly, this invention relates to a tool and method for forming features in pre-drilled holes using electrochemical machining.

2. Description of the Related Art

A specialized adaptation of electrochemical machining, known as shaped-tube electrochemical machining (STEM), is used for drilling small, deep holes in electrically conductive materials. STEM is a noncontact electrochemical drilling process that can produce holes with aspect ratios as high as 300:1. It is the only known method which is capable of manufacturing the small, deep holes used for cooling blades of efficient gas turbines.

The efficiency of a gas turbine engine is directly proportional to the temperature of turbine gases channeled from the combustor of the engine and flowing over the turbine blades. For example, for gas turbine engines having relatively large blades, turbine gas temperatures approaching 2,700° F. are typical. To withstand such high temperatures, these large blades are manufactured from advanced materials and typically include state-of-the-art type cooling features.

A turbine blade is typically cooled using a coolant such as compressor discharge air. The blade typically includes a cooling hole through which the air passes. A further design advancement has been the addition of internal ridges in the cooling hole to effect turbulent flow through the hole and increase cooling efficiency. Cooling features within the hole such as turbulence promoting ribs, or turbulators, thus increase the efficiency of the turbine.

The cooling holes commonly have an aspect ratio, or depth to diameter ratio, as large as 300:1, with a diameter as small as a few millimeters. The turbulators extend from sidewalls of the hole into the air passage about 0.2 mm., for example.

The method currently used for drilling the cooling holes in turbine blades is a shaped-tube electrochemical machining (STEM) process. In this process, an electrically conductive workpiece is situated in a fixed position relative to a movable manifold. The manifold supports a plurality of drilling tubes, each of which are utilized to form an aperture in the workpiece. The drilling tubes function as cathodes in the electrochemical machining process, while the workpiece acts as the anode. As the workpiece is flooded with an electrolyte solution from the drilling tubes, material is deplated from the workpiece in the vicinity of the leading edge of the drilling tubes to form holes.

Turbulated ridges are formed in the cooling holes by a modification of the standard shaped-tube electrochemical machining (STEM) process for drilling straight-walled holes. One common method is termed cyclic dwelling. With this technique, the drilling tube is first fed forward, and then the advance is slowed or stopped in a cyclic manner. The dwelling of the tool that occurs when the feed rate is decreased or stopped creates a local enlargement of the hole diameter, or a bulb. The cyclic dwelling, for which cyclical voltage changes may be required, causes ridges to be formed between axially spaced bulbs. These ridges are the turbulators.

The cyclic dwelling method is very low in process efficiency compared to shaped-tube electrochemical machining (STEM) drilling of straight-walled holes because of the lengthy required time for drilling each bulb individually by cyclic tool dwelling. The dwell time required to form a single bulb can be greater than the time for drilling an entire straight-walled hole.

U.S. Pat. No. 5,306,401 describes a method for drilling cooling holes in turbine blades that uses a complex tool resetting cycle for each turbulator in the hole. This method also has low process efficiency, having even longer operating times for drilling the turbulator ridges than the cyclic dwelling method because of the time required to reset the electrode tool.

In addition, both the cyclic dwelling method and the method disclosed in U.S. Pat. No. 5,306,401 require that additional equipment: be used with a standard STEM machine for control of machine ram accuracy, electrolyte flow and power supply consistency, since these are crucial to hole quality. Failure to control the dimensions of the turbulated holes often leads to part rejection, adding significant manufacturing costs for the machining process.

Accordingly, there is a need in the art for a new and improved method for manufacturing turbulators that has a relatively short machining cycle time. There is an additional need for an improved method of manufacturing more complex features such as spiral or helical ridges and the like. There is an additional need for a method utilizing relatively simple and easily implemented manufacturing techniques. In particular, there is a need for a method that does not require complex lateral or vertical displacement of the electrode.

SUMMARY OF THE INVENTION

An electrochemical machine is disclosed for use in an electrochemical machining process to simultaneously generate different levels of metal removal. The electrochemical machine comprises at least two electrodes, each including an electrically conductive cylinder having an external surface partially coated with an insulated coating. The insulating coating is in a pattern defining raised areas to be formed on an internal surface of a predrilled hole in a workpiece wherein at least one of the electrodes has a varied pattern of insulating coating.

BRIEF DESCRIPTION OF THE DRAWINGS

FIG. 2 is a schematic representation of an electrode coated with an insulating dielectric material in a pattern defining raised areas or ridges to be machined in a predrilled straight-walled hole, in accordance with the principles of one embodiment of the present invention;

FIG. 3 is a schematic representation of the hole shown in FIG. 2 after the raised areas have been formed with an electrode of the present invention;

DETAILED DESCRIPTION

Figure 1:
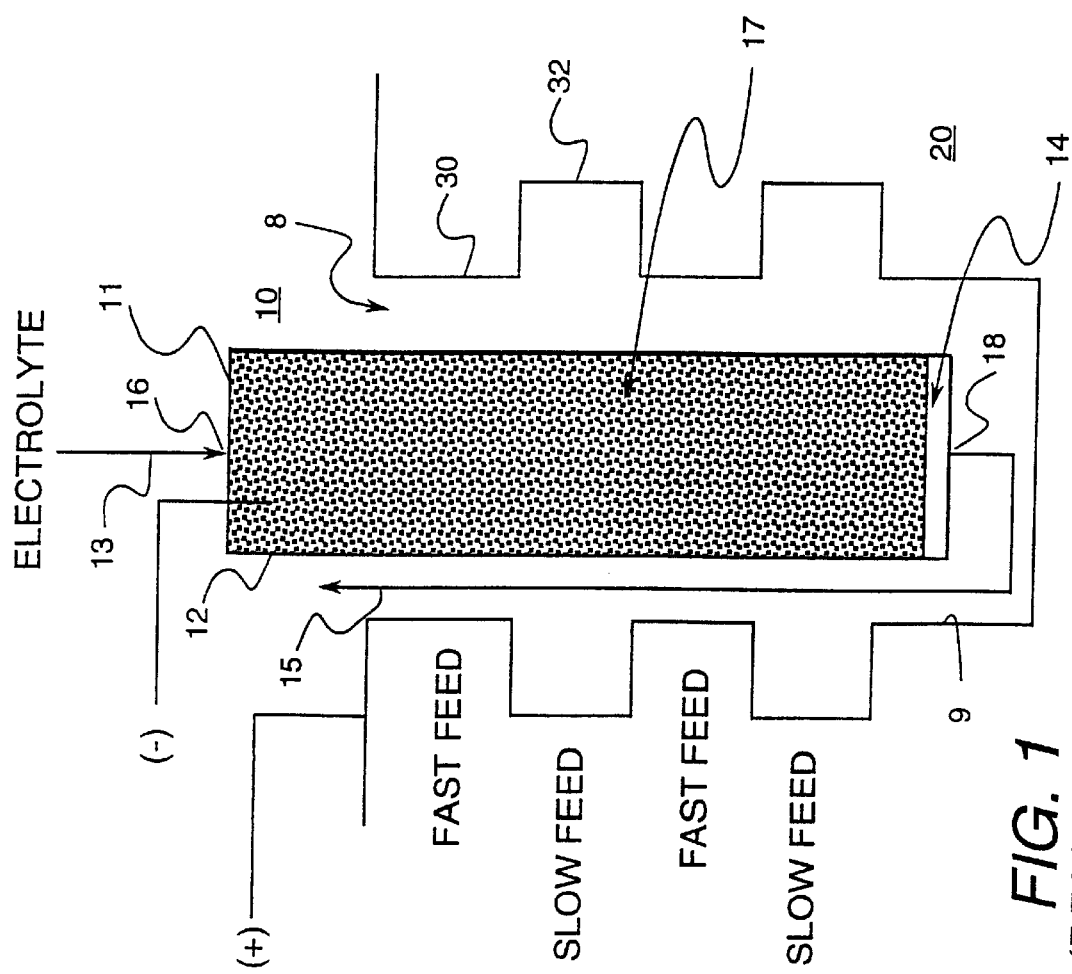
FIG. 1 is a schematic representation of a conventional shaped-tube electrochemical machining (STEM) electrode.

A better understanding of the invention may be gained by reference to the drawings. FIG. 1 is a schematic view illustrating a conventional shaped-tube electrochemical machining (STEM) electrode 10 and the operation of electrode 10 in electrochemically machining a hole 8 having interior walls 9 in an electrically conductive workpiece 20. Electrode 10 of the prior art is a hollow metal tube 11 coated on an exterior surface with an insulating dielectric material 12 except at the end proximate to electrically conductive workpiece 20, where a band 14 of exposed metal is disposed. During the drilling operation, an electrolyte solution is continuously circulated through the body of electrode 10 and hole 8 while an electrical potential is applied between electrode 10 and workpiece 20. The solution is pumped to an inlet 16 at the end of electrode 10 opposite the end composed of band 14 of exposed metal, through the body of electrode 10, and through an end hole 18, which end hole 18 is enclosed by band 14 of exposed metal, through hole 8 and out of the upper end of hole 8, to be collected in a sump (not shown). The direction of electrolyte circulation is shown generally by arrows 13 and 15.

Electric current passes between band 14 of exposed metal electrode 10 and a portion of wall 9 of hole 8 directly adjacent to band 14 of exposed metal, resulting in removal of metal from that area of wall 9. Electrical insulation by dielectric material 12 blocks the current flow in coated areas 17 on the exterior surface of electrode 10, so that no deplating occurs in the areas of wall 9 opposite coated areas 17. The electrolyte solution dissolves the deplated metal and carries the dissolved metal out of hole 8. Because of the geometry of the exposed conductive surface of electrode 10, a current is established primarily in a lateral direction toward wall 9. Current density decreases as the distance between wall 9 and band 14 of exposed metal of electrode 10 increases due to material dissolution, limiting the depth drilled. In addition, operating conditions such as total machining time, pulse amplitude, pulse on-time, and pulse off-time determine the total electrical charges passing through the machined areas, which operating conditions in turn determine the amount of metal removal. As is known, these parameters, along with the nature and concentration of the electrolyte and the operating voltage determine the diameter of hole 8.

The conventional method of forming raised areas such as ribs or ridges in hole 8 is to remove metal from areas of hole 8 adjacent to the desired location of the raised area to form bulbs 32 by a modified shaped-tube electrochemical machining (STEM) process. The cyclic dwelling method of the prior art uses a cyclically varying feed rate to form bulbs 32 of diameter greater than that of the straight portion 30 of the hole. FIG. 1 shows the cyclic dwelling method schematically. The feed rate is relatively fast when drilling straight portion 30 of the hole, and relatively slow when drilling bulbs 32. Similarly, cyclic variation of voltage can cause formation of bulbs, or enhance the bulbing process. However, cyclic variation of voltage requires a sophisticated power output.

The electrode and methods of the present invention provide for convenient, cost effective machining of features in holes with large aspect ratios. Examples of the features that may be produced are turbulators in cooling holes in turbine airfoils, rifling in gun barrels, and grooves in air bearing shafts.

With the improved electrode and machining process of the invention, it is possible to machine as many bulbs as desired, in whatever configuration desired, while achieving a significant reduction in process time. Furthermore, no variation of process parameters such as feed rate or voltage are needed; therefore, costly sophisticated controls for the instrument are not required.

FIG. 2 depicts an electrode 100 in accordance with one embodiment of the invention in a predrilled hole 101 having a straight wall 102, of an electrically conductive workpiece 110. FIG. 3 shows electrode 100 in the same hole 101 after bulbs 120 and intervening raised areas, or ridges 122, have been created. In the embodiment shown in FIGS. 2 and 3, electrode 100 comprises a hollow cylindrical electrically conductive cylinder 105 coated with an electrically insulating coating 103 in a pattern having intervening areas 104 of exposed metal or conductive material on the exterior surface. The pattern of insulating coating 103 defines raised areas or ridges to be machined in predrilled hole 101. In this embodiment, the pattern is a series of rings 106. The (+) and (−) designations indicate pulsed voltage through the body of electrode 100 and workpiece 110.

As shown in FIG. 3, areas of exposed conductive material 104 on the surface of electrode 100 define areas where bulbs 120 are formed by removal of metal from wall 102 of hole 101. Raised areas or ridges 122 are created in wall 102 of hole 101 where no deplating occurs in the vicinity of insulated portions 106 of the surface of electrode 100.

FIGS. 2 and 3 depict an embodiment of the invention where electrode 100 consists of cylinder 105, having a body composed off an electrically conductive material. The diameter of cylinder 105 may be as small or as large as necessary to fit the predrilled hole. However, the outside diameter of cylinder 105, measured over the coated surface, typically ranges between about 1 mm to about 8 mm. The thickness of coating 103 is typically in the range between about 0.15 to about 0.2 mm thick.

Cylinder 105 allows for pumping of an electrolyte solution into hole 101 through an inlet 112 at the end of electrode 100 extending outside hole 101 and out of end hole 114 at the other end of electrode 100. Inlet 112 and end hole 114 facilitate uniform electrolyte flow through the areas being machined. Electrode 100 may also have electrolyte outlets 116 along the exposed surface of electrode 100. Outlets 116 in addition to end hole 114 may be desirable where relatively large areas are being machined. The size of outlets 116 determines the added amount of electrolyte supplied to machining areas, which in turn determines surface quality of the bulbs 120 as well as metal removal uniformity.

The operation of a shaped-tube electrochemical machining (STEM) instrument with an electrode of the present invention is similar to that with a conventional electrode. Current is provided by coupling electrode 100 to a negative terminal of a STEM power supply (not shown) and workpiece 110 to a positive terminal. Electrode 100 is positioned inside smooth-walled hole 101 obtained from a previous drilling step. An electrolyte solution, which solution may be the same electrolyte as used in the first drilling step, is pumped into an end of hole 101 under pressure. Where electrode 100 is hollow and may contain outlets 116 for the electrolyte, the solution is pumped into inlet 112 of electrode 100. In this embodiment, the electrolyte flows into inlet 112 and out through outlets 116 along the side surface of electrode 100 and end hole 114. All raised areas or ridges as defined by the pattern of the coating of electrode 100 may be formed in hole 101 simultaneously.

The body of electrode 100 of the invention is composed of a conductive material, preferably titanium because of titanium's resistance to electrolytic action. The outer surface of the electrode body is covered with an electrically insulating coating 103 in a pattern that leaves some areas of the surface exposing the conductive material of the body. Coating 103 is made of a dielectric material, which dielectric material should preferably be smooth, of even thickness, tightly adhered to the surface of the body and free of pinholes or foreign material. Exemplary dielectric materials suitable for electrode 100 of the present invention include polyethylene, polytetrafluoro-ethylene, ceramics, and rubbers.

The pattern in coating 103 on the electrode body of the present invention defines raised areas or ridges 122 to be formed in predrilled hole 101. A preferred pattern is at least one ring 106 or band circumferentially disposed on the external surface of electrode 100. A more preferred pattern is a series of rings or bands 106 circumferentially disposed on the external surface of electrode 100. The present invention, however, contemplates employing any pattern configuration desired. Examples of other configurations that may be employed are lines, rings or bands longitudinally disposed along the external surface of electrode 100. Additional configurations that may be employed are steps or staircases, and one or more spirals or helices. The geometric components of the pattern may also be disposed orthogonally or obliquely, relative to a longitudinal axis 107 of electrode 100.

Figure 4:
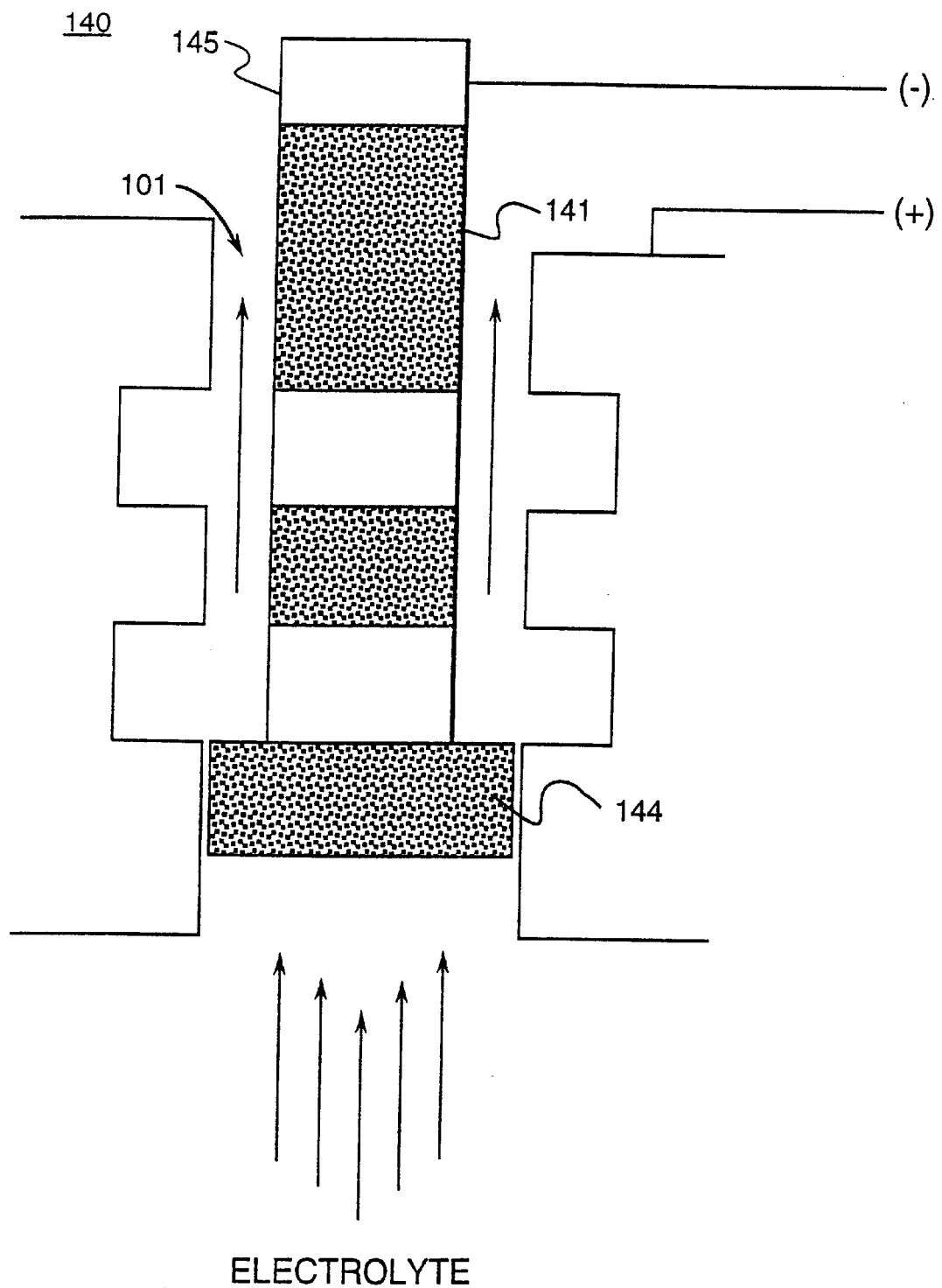
FIG. 4 is a schematic representation of an electrode of the present invention that is solid, situated in a hole and includes a locator to position the electrode in the hole.

FIG. 4 illustrates another embodiment of the invention where an electrode 140 is solid and may include a locator 144 at one end. The function of locator 144 is to position electrode 140 in hole 101 properly, such that electrode 140 is coaxial with the walls of hole 101. Locator 144 is preferably composed of the same material(s) as an insulating coating 141 in other areas on the exterior surface of electrode 140, differing only in the thickness of coating 141. The outside diameter of electrode 140 measured at locator 144 is less than the inside diameter of hole 101. This outside diameter should be sufficiently small that electrode 140 may be easily inserted in hole 101, but sufficiently large so that electrode 140 fits snugly within hole 101. Locator 144 preferably comprises a coating of greater thickness compared to coating 141 on other parts of electrode 140. For example, the thickness of the coating 141 is typically in the range between about 50 to about 75 microns, while locator 144 typically comprises a thickness in the range between about 100 to about 150 microns.

Figure 5:
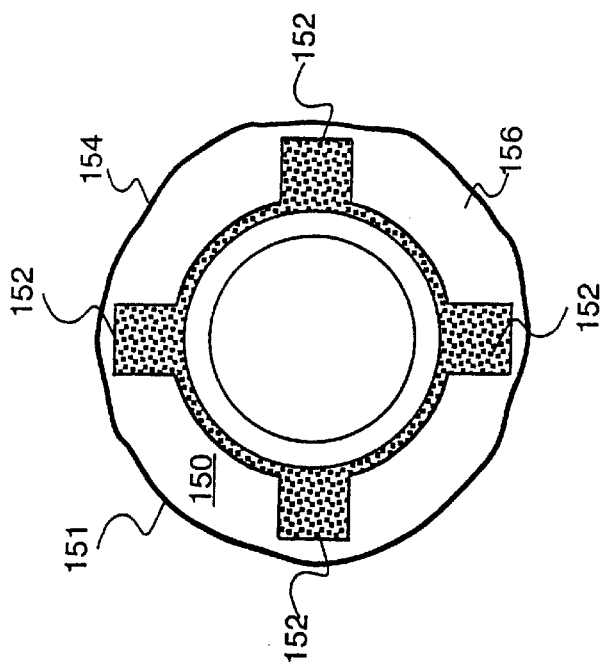
FIG. 5 is a cross-sectional view through a locator.

FIG. 5 depicts a cross-section of a locator 150 in a non-circular hole 151. Locator 150 should have at least three points on a surface in contact with wall 154 of hole 151, and should allow for free flow of electrolyte through hole 151. Exemplary locator 150 has four arms 152 in contact with wall 154 of hole 151. Electrolyte flows through spaces 156 between arms 152. No metal is exposed between arms 152.

Figure 6:
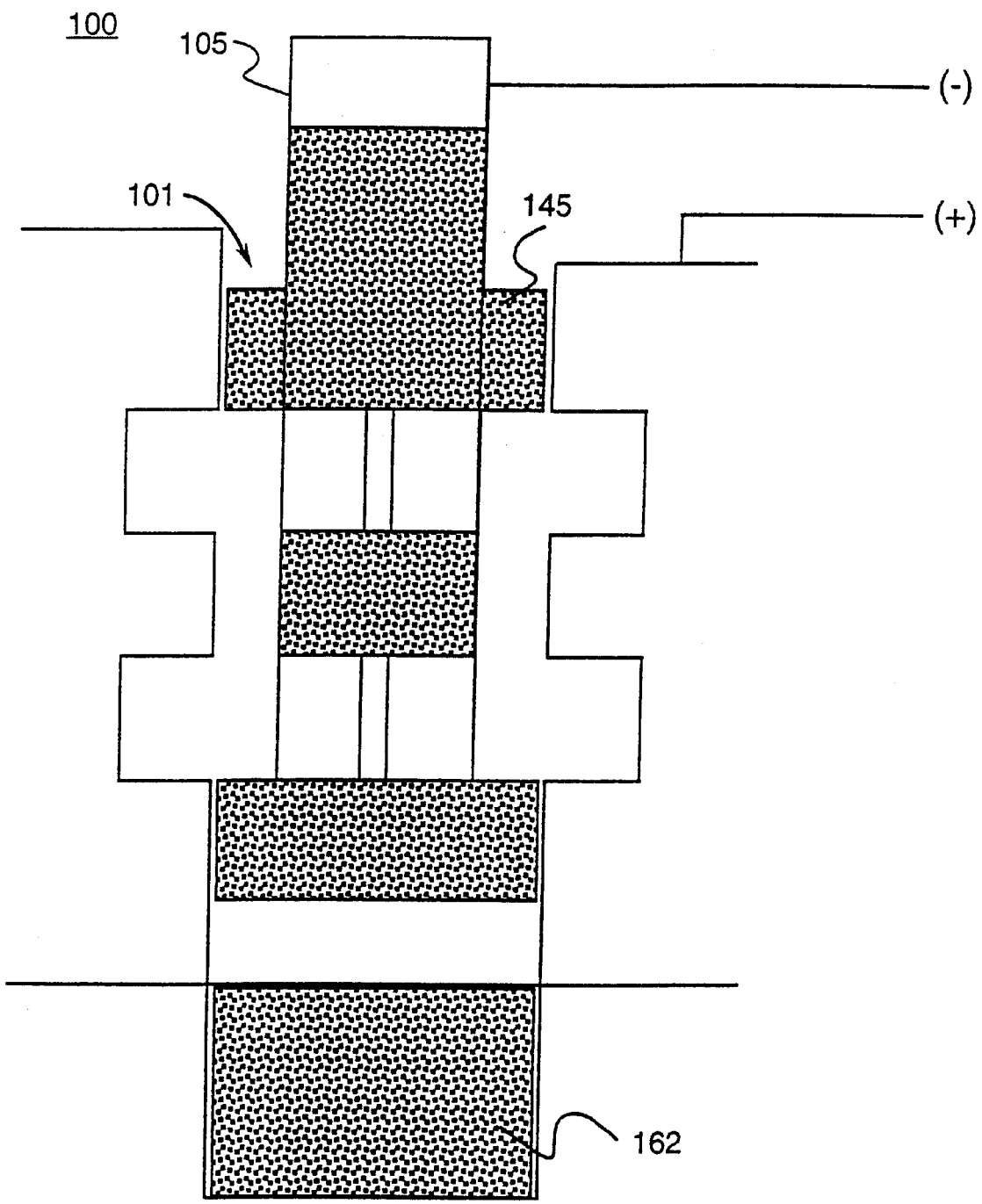
FIG. 6 is a schematic representation of an electrode of the present invention that is hollow, and situated in a blocked hole.
Figure 7:
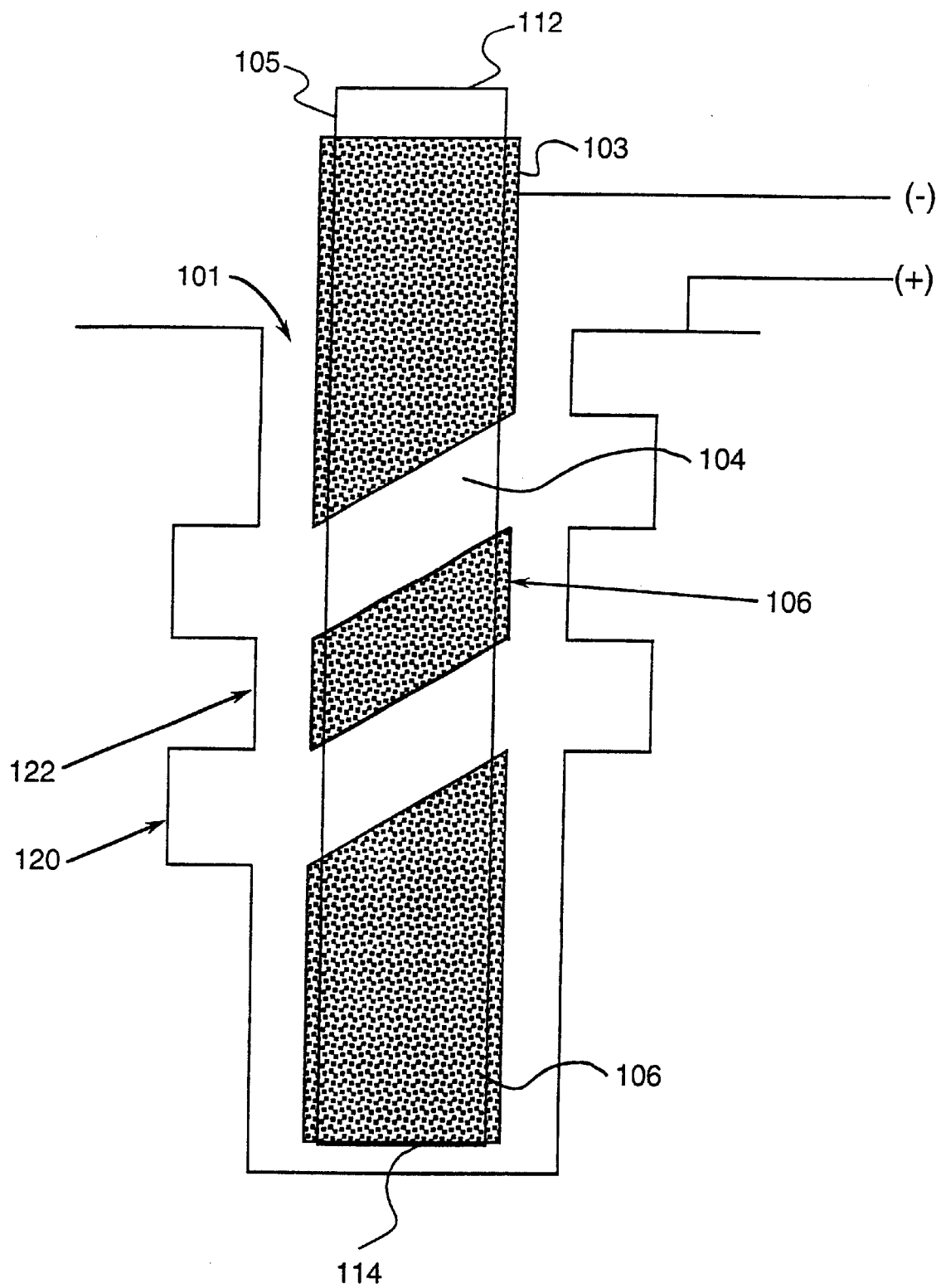
FIG. 7 is a schematic representation of another embodiment of an electrode in accordance with the instant invention.

A locator is preferably disposed near the end of electrode 100 inserted in hole 101. Where the cross section of hole 101 is not circular, it may be desirable to provide additional locator(s) 147 to aid in centering electrode 100 in hole 101. A preferred position for such an additional locator 145 is at a midsection of electrode 100 as shown in FIG. 6.

The electrode and method of the invention may be used with a workpiece having blind (i.e. non-through) holes or through holes. As described above, uniform electrolyte flow is important for ensuring surface as well as metal removal uniformity. In one embodiment of the invention, uniform electrolyte flow through a blind hole is provided for. This is illustrated in FIG. 3. The electrolyte solution is preferably passed through the interior of a hollow electrode 100, into hole 101 and out of the opening at the upper end of hole 101 and is collected in a suitable sump (not shown).

For through holes, or holes with more than one opening, some measure is preferably taken to ensure uniform electrolyte flow inside hole 101. Through holes are commonly used in gas turbine blades. For example, the cooling holes that are frequently manufactured in such blades using shaped-tube electrochemical machining (STEM) have an inlet and an outlet for the flow of coolant.

One method to ensure uniform electrolyte Sow in a through hole is to block one end of the hole. FIG. 6 illustrates this method, with a through hole blocked with a plug 162 of suitable material, for example, rubber. Using this method, the electrolyte solution may be passed through a hollow electrode 100 such as that depicted in FIG. 2 and 3. The outlet(s) for the solution may be located either along the side or at the lower end of electrode 100. Where the electrode is solid and the predrilled hole is a through hole, electrolyte solution may be pumped in one end of the hole and out the other end.

FIG. 4 shows the second method to ensure uniform electrolyte flow in a through hole where the electrode is solid. Electrode 140 consists of a solid body 145 coated with a suitable dielectric material 141 in a pattern, leaving areas where electrically conductive material of the body is exposed, and a locator 144. Using this method, electrolyte is pumped, for example, from the lower end of hole 101, around electrode 140, and out of the upper end of the hole 101.

EXAMPLE

A straight-walled hole was drilled in a workpiece made up of two pieces of stainless steel clamped together. The hole was drilled at the interface where the two pieces were joined using a standard STEM apparatus and a conventional electrode similar to that shown in FIG. 1. After the straight drilling was completed, an electrode according to the present invention, such as that illustrated in FIGS. 2 and 3, was connected to the STEM apparatus, and placed within the predrilled hole. A set of bulbs was simultaneously electrochemically machined in the hole, leaving raised areas, or ridges, between the bulbs. The spacing of the rings of insulating material in the pattern on the electrode correlated with the spacing of the ridges in the hole, and the width of the rings correlated with the width of the ridges.

In another embodiment, the method of the instant invention can be used to simultaneously generate different types of turbulators in the inside walls of different cooling holes in the same turbine blade by an electrochemical machining process. This embodiment of the invention uses specially-designed tooling to eliminate the time-consuming and complex tool movements as are characterized by the prior art that are used to create a single type of turbulator for each drilling pass. This method greatly shortens machining cycle time, improves turbulator geometrical consistency, and reduces fixturing costs.

As described a special tool electrode is discussed that has insulated ring coatings along the electrode for creating the ridges. When in use, this electrode is connected to a negative terminal of the STEM power supply and is placed inside the smooth-walled hole obtained from the previous drilling step. An electrolyte is flushed between the electrode and the wall of the hole. When a DC voltage is applied between the electrode and the workpiece, the uncoated portions of electrode would cause electrochemical dissolution in the workpiece, at locations that directly face the uncoated electrode while the coated portions of elect rode cause minimum workpiece dissolution at their nearby locations. Thus, "bulbs" are generated in the workpiece locations that directly face the uncoated portions of electrode while ridges are formed in the workpiece locations that directly faced the coated portion of the electrode. This method enables one to generate different turbulator patterns at different locations, whether in different sections of the same hole or in different holes simply by applying different insulating coating patterns (e.g., insulated coating ring spacing and ring width) to different electrodes or different sections of the same electrode.

To simultaneously make turbulated holes and non-turbulated holes, simply insert turbulating electrodes in the holes that need to be turbulated while blocking the holes that do not need turbulating. Turbulating only occurs in the holes that have turbulating electrodes and have electrolyte flushing therethrough. The blocked smooth holes will remain unturbulated. It is important to block the holes because the leakage of electrolyte through these holes would create an electrolyte shortage in the turbulated areas.

To simultaneously make different turbulator patterns (different pitches and rib sizes) in different holes of the same blade, different turbulating electrodes are inserted with different insulated coating pitches and coating ring widths as well as different electrode diameters according to the pre-drilled holes sizes. Since each hole is typically subject to the same voltage and machining time, the depths of metal removal in the walls of the holes, i.e., the turbulator rib heights, need to be predetermined for different turbulator patterns. To obtain required different rib heights, one needs to select different electrode diameters for different rib height requirement. In general, when a larger rib height is needed, a thicker electrode is needed so that the gap between the electrode and the wall of the hole is smaller, leading to more metal removal. The theory behind this practice is Faraday's Law of Electrolysis and Ohm's Law.

To simultaneously make different turbulator patterns (different pitches and rib sizes) in the same hole, simple use an electrode with different patterns of insulation coatings on it along its length accordingly.

The above turbulating methods work because the spacing of the insulative ring is highly correlated with the spacing of the turbulated ridges in the hole; and the coating ring width is highly correlated with the turbulated ridge width. Power settings such as total machining time, pulse amplitude, pulse on-time, and pulse off-time will determine collectively the total electrical charges passing through the machining areas, which in turn determines the amount of metal removal, and therefore, the turbulator ridge height. Under the same power settings, the gap between uncoated electrode outer diameter and the hole wall determines how much metal can be removed from the wall during a set period of time. The smaller the gap, the faster the removal rate. This principle can be used to select electrode diameters for obtaining the required rib height differences among different turbulated holes.

While only certain features of the invention have been illustrated and described, many modifications and changes will occur to those skilled in the art. It is, therefore, to be understood that the appended claims are intended to cover all such modifications and changes as fall within the true spirit of the invention.

What is claimed is:

1. An electrochemical machine for use in an electrochemical machining process to simultaneously generate different levels or patterns of metal removal within at least two holes, said electrochemical machine comprising:

at least two electrodes each including an electrically conductive cylinder having an external surface partially coated with an insulating coating in a pattern defining raised areas to be formed on an internal surface of a respective predrilled hole in a workpiece, wherein at least one of said electrodes has a varied pattern of insulating coating.

2. An electrochemical machine according to claim 1 wherein said cylinder is solid.

3. An electrochemical machine according to claim 1 wherein said cylinder is hollow.

4. An electrochemical machine according to claim 3, additionally comprising an inlet to said cylinder for an electrolyte solution and at least one outlet from said cylinder for the solution.

5. An electrochemical machine according to claim 4, wherein the inlet is situated at one end of the cylinder and the outlet is located at another end of the cylinder.

6. An electrochemical machine according to claim 4, wherein the inlet is situated at one end of the cylinder and the outlet is located along a side surface of the cylinder.

7. An electrochemical machine according to claim 1, wherein the pattern is comprised of at least one ring circumferentially disposed on the external surface of the cylinder.

8. An electrochemical machine according to claim 1, additionally comprising at least one locator on said cylinder to position the electrode within the hole.

9. An electrochemical machine according to claim 8, wherein said at least one locator is disposed at a forward end of the cylinder and comprises a coating of said insulating material thicker than the insulating material in the pattern.

10. An electrochemical machine according to claim 9, wherein a second locator is disposed at a midsection of the cylinder.

11. An electrochemical machine according to claim 1 wherein the pattern comprises a plurality of spaced apart rings circumferentially disposed on the external surface of the cylinder.

12. An electrochemical machine according to claim 1, wherein said pattern is a helical pattern.

13. An electrochemical machine according to claim 1, wherein said pattern is a spherical pattern.

14. An electrochemical machining process for forming raised areas in walls of at least two predrilled holes in a workpiece comprising:

positioning in each respective hole an electrode coated with an insulating material in a pattern defining the raised area to be formed in the wall of the hole, wherein at least one of said electrodes has a varied pattern of insulating coatings, and machining at least one bulb in the wall of each hole by passing an electric current between the electrode positioned in the hole and the workpiece while circulating an electrolyte solution through the hole so as to simultaneously generate different levels of metal removal within each respective hole.

15. An electrochemical machining process according to claim 14 further comprising simultaneously forming a plurality of raised areas in the surface of the hole with the electrode.

16. An electrochemical machining process according to claim 15 wherein said electrode is stationarily positioned in said hole while said plurality of raised areas are simultaneously formed with the electrode.

17. An electrochemical machining process according to claim 15 wherein the hole has a non-circular cross section and further comprising positioning the electrode in a center of said hole.

18. An electrochemical machining process according to claim 14 further comprising positioning the electrode in a center of said hole with a locator associated with said electrode.

19. An electrochemical machining process according to claim 14 wherein the electrolyte solution is passed through the electrode into the hole.

20. An electrochemical machining process according to claim 14 wherein the electrolyte solution is passed through the hole around the electrode.

21. An electrochemical machining process according to claim 14 wherein the workpiece comprises a turbine blade and the raised area comprises a turbulator ridge.

22. A turbine blade manufactured according to claim 21.

* * * * *